US007555264B2

(12) United States Patent
Ishiwata et al.

(10) Patent No.: US 7,555,264 B2
(45) Date of Patent: Jun. 30, 2009

(54) BLUETOOTH MASTER SELECTING METHOD, BLUETOOTH MASTER SELECTING PROGRAM AND BLUETOOTH APPARATUS

(75) Inventors: Atsushi Ishiwata, Muko (JP); Toshihiro Tatsumi, Kyoto (JP)

(73) Assignee: Panasonic Corporation, Osaka (JP)

( * ) Notice: Subject to any disclaimer, the term of this patent is extended or adjusted under 35 U.S.C. 154(b) by 329 days.

(21) Appl. No.: 10/864,892

(22) Filed: Jun. 10, 2004

(65) Prior Publication Data

US 2005/0014467 A1 Jan. 20, 2005

(30) Foreign Application Priority Data

Jun. 12, 2003 (JP) .......................... P. 2003-167937
May 17, 2004 (JP) .......................... P. 2004-145994

(51) Int. Cl.
*H04B 7/24* (2006.01)
(52) U.S. Cl. .................... 455/39; 455/41.2; 455/67.11; 455/456.1
(58) Field of Classification Search .................. 455/39, 455/41.2, 67.1, 456.1
See application file for complete search history.

(56) References Cited

U.S. PATENT DOCUMENTS 6,471,011 B1 * 10/2002 Ando et al. ................ 187/247
6,885,847 B1 * 4/2005 Lumelsky ................. 455/41.2
2002/0090914 A1 7/2002 Kang et al.
2002/0168943 A1 * 11/2002 Callaway et al. ........... 455/67.1
2002/0183006 A1 * 12/2002 Yasushi et al. ............... 455/41
2003/0093542 A1 * 5/2003 Saito et al. .................. 709/230
2003/0124979 A1 7/2003 Tanada et al.
2004/0259499 A1 * 12/2004 Oba et al. ................. 455/41.2
2008/0037495 A1 * 2/2008 Anjum et al. ............... 370/338

* cited by examiner

*Primary Examiner*—Nay A Maung
*Assistant Examiner*—Tuan H Nguyen
(74) *Attorney, Agent, or Firm*—McDermott Will & Emery LLP

(57) ABSTRACT

The present invention provides a method for automatically selecting, as a master, an optimum Bluetooth device for the master which can be stably connected to more devices in a Bluetooth network. According to the present invention, each of Bluetooth apparatuses capable of being masters acquires the device address of the connectable Bluetooth apparatus in response to an inquiry at 101, then, the each Bluetooth apparatus capable of being the masters acquires evaluation information such as the number of device address discoveries from the other Bluetooth apparatuses at 105, and the evaluation information of a self-device is compared with the acquired evaluation information of the other device at 106 to 113 in order to determine the Bluetooth apparatus to be the master based on a predetermined evaluating method for the evaluation information which is acquired. Thus, the master/slave decision of the self-device is caused to proceed.

15 Claims, 14 Drawing Sheets

FIG. 10

RESULT OF INQUIRY OF DEVICE T1
(NUMBER OF DISCOVERIES = 2, TOTAL NUMBER OF DISCOVERIES = 6) ~1001

|  | FIRST TIME | SECOND TIME | THIRD TIME |
|---|---|---|---|
| DEVICE T2 | ○ | ○ | ○ |
| DEVICE T3 | × | × | × |
| DEVICE T4 | ○ | ○ | ○ |

RESULT OF INQUIRY OF DEVICE T2
(NUMBER OF DISCOVERIES = 3, TOTAL NUMBER OF DISCOVERIES = 5) ~1002

|  | FIRST TIME | SECOND TIME | THIRD TIME |
|---|---|---|---|
| DEVICE T1 | ○ | ○ | × |
| DEVICE T3 | ○ | × | ○ |
| DEVICE T4 | × | ○ | × |

○ : SUCCESSFUL DISCOVERY IN RESPONSE TO INQUIRY
× : NO DISCOVERY IN RESPONSE TO INQUIRY

BLUETOOTH MASTER SELECTING METHOD, BLUETOOTH MASTER SELECTING PROGRAM AND BLUETOOTH APPARATUS

BACKGROUND OF THE INVENTION

1. Field of the Invention

The present invention relates to a Bluetooth master selecting method, a Bluetooth master selecting program and a Bluetooth apparatus which serve to select a master from the Bluetooth apparatus for building a Bluetooth network.

2. Description of the Related Art

In a Bluetooth network, there are a Bluetooth apparatus to be a master and a Bluetooth apparatus to be a slave. The master is connected to a large number of slave devices in a one-many connection and serves as a device for generating a connection request (Create Connection) by itself, and the slave is connected to only the master one-on-one in the one-many connection and serves as a device for accepting the connection request (receiving Page Scan).

In a conventional Bluetooth device, a method of determining a master or a slave is roughly divided into two methods. A first method is a factor for determining whether the type of a device is the master or the slave, and a cell phone is determined to be the master and a head set is determined to be the slave, for example.

A second method serves to select the master or the slave by the operation of a user. For example, in the case in which household electric appliances build the Bluetooth network, the user is to carry out an operation for selecting the master or the slave for respective devices.

FIG. 13 is a diagram for explaining a state in which the electric appliance thus builds the Bluetooth network. In FIG. 13, 1301 to 1303 denote Bluetooth devices T1, T2 and T3 respectively, and 1311 to 1313 denote radio communication regions of the Bluetooth devices T1, T2 and T3 respectively.

Since the Bluetooth devices T1 and T3 are positioned on the outside of the mutual radio communication regions, the user is to set T1, T2 and T3 to be the slave, the master and the slave based on a method of operating the devices, respectively. A procedure and method for determining the master or the slave has been prescribed in Non-Patent Document 1 (Specification of the Bluetooth System Version 1.1, Feb. 22, 2001, [Retrieved on May 30, 2003], Internet <URL:http://www.bluetooth.com>) as Bluetooth standards.

Only in the case in which the master and the slave are determined uniquely based on the structure of a device, the first method can be applied. When a plurality of Bluetooth devices is to be connected to each other, particularly, such a determining method cannot be used.

In the second method, a great deal of time and labor is required for manually operating each device by the user. Furthermore, a general user does not know the Bluetooth technology well. For this reason, it is hard to decide an optimum master.

More specifically, in the Bluetooth network, one Bluetooth device to be the master is permitted for each subnet, and a communication is always carried out through the Bluetooth device to be the master. Also in the case in which the communication is to be carried out between slaves 1 and 2, it is performed in a course of the slave 1 to the slave 2 via the master.

Therefore, a Bluetooth device capable of being stably connected to more Bluetooth devices is the optimum master. However, it is hard for the general user to determine the optimum master. Even if an optimum Bluetooth device is set to be the master, moreover, it is necessary to newly select the optimum master when the arrangement of the Bluetooth device is changed. As a result, a great deal of time and labor is required.

SUMMARY OF THE INVENTION

In consideration of the circumstances, it is an object of the invention to provide a Bluetooth master selecting method, a Bluetooth master selecting program and a Bluetooth apparatus which can automatically select, as a master, an optimum Bluetooth device for the master which is stably connected to more devices in a Bluetooth network without bothering a general user.

A first aspect of the invention is directed to a Bluetooth master selecting method for selecting a master from a Bluetooth apparatus to build a Bluetooth network, comprising the steps of acquiring a Bluetooth device address of a connectable Bluetooth apparatus in response to an inquiry (Inquiry) by the respective Bluetooth apparatuses capable of being the masters, acquiring necessary evaluation information from the respective Bluetooth apparatuses having the acquired Bluetooth device addresses by the respective Bluetooth apparatuses capable of being the masters, and determining the Bluetooth apparatus to be the master based on a predetermined evaluating method for the evaluation information.

According to the structure, it is possible to acquire the necessary evaluation information from the other Bluetooth apparatuses to which the respective Bluetooth apparatuses capable of being the masters can be connected and to carry out the evaluation by the predetermined method, and to compare them with each other, thereby deciding whether the self-device or the other device is suitable for the master. Therefore, it is possible to automatically select, as the master, the Bluetooth apparatus having an optimum evaluation without a manual operation.

A second aspect of the invention is directed to the Bluetooth master selecting method according to the first aspect of the invention, wherein the step of determining the Bluetooth apparatus to be the master determines the Bluetooth apparatus to be the master based on a predetermined evaluating method for a plurality of evaluation information in preset order.

According to the structure, the Bluetooth apparatus to be the master is determined based on the predetermined evaluating method for a plurality of evaluation information in the preset order. In the predetermined evaluating method for a plurality of evaluation information, consequently, second evaluation information is evaluated if the master is not determined based on the evaluation of first evaluation information, and third evaluation information is evaluated if the master is not determined based on the evaluation of the second evaluation information. Thus, new evaluation information can be evaluated until the Bluetooth apparatus to be the master is determined. Also in the case in which a difference in the evaluation between the devices to be master candidates is small, therefore, it is possible to automatically select, as the master, the Bluetooth apparatus having an optimum evaluation.

A third aspect of the invention is directed to the Bluetooth master selecting method according to the first or second aspect of the invention, wherein the predetermined evaluating method for the evaluation information determines, as the master, a Bluetooth apparatus having the largest number of Bluetooth device address discoveries in the connectable Bluetooth apparatus which are acquired by the respective Bluetooth apparatuses capable of being the masters.

According to the structure, the numbers of Bluetooth device address discoveries acquired by the respective Bluetooth apparatuses capable of being the masters are compared with each other. Consequently, it is possible to automatically select, as the master, the Bluetooth apparatus having the maximum number of connectable devices.

A fourth aspect of the invention is directed to the Bluetooth master selecting method according to the first or second aspect of the invention, wherein the predetermined evaluating method for the evaluation information determines, as the master, a Bluetooth apparatus having the greatest predetermined evaluation value of received signal power from the Bluetooth apparatuses to which the respective Bluetooth apparatuses capable of being the masters can be connected.

According to the structure, the evaluation values of the electric field strengths acquired by the respective Bluetooth apparatuses to be the masters are compared with each other. Consequently, it is possible to automatically select, as the master, the Bluetooth apparatus having a high radio connection strength.

A fifth aspect of the invention is directed to the Bluetooth master selecting method according to the first or second aspect of the invention, wherein the predetermined evaluating method for the evaluation information determines, as the master, a Bluetooth apparatus having the best predetermined evaluation value of sensitivity performance (bit error rate) from the Bluetooth apparatuses to which the respective Bluetooth apparatuses capable of being the masters can be connected.

According to the structure, the evaluation values of the sensitivity performance acquired by the respective Bluetooth apparatuses capable of being the masters are compared with each other. Consequently, it is possible to automatically select, as the master, the Bluetooth apparatus which is resistant to a radio communication error.

A sixth aspect of the invention is directed to the Bluetooth master selecting method according to the first or second aspect of the invention, wherein the predetermined evaluating method for the evaluation information determines, as the master, a Bluetooth apparatus having the greatest evaluation value of CPU allowances in the respective Bluetooth apparatuses capable of being the masters.

According to the structure, the evaluation values of the CPU allowances of the respective Bluetooth apparatuses capable of being the masters are compared with each other. Consequently, it is possible to automatically select, as the master, the Bluetooth apparatus having the allowance of a throughput and less stagnation of a communication between devices.

A seventh aspect of the invention is directed to the Bluetooth master selecting method according to the first or second aspect of the invention, wherein the predetermined evaluating method for the evaluation information determines, as the master, a Bluetooth apparatus having the greatest evaluation value of power allowances in the respective Bluetooth apparatuses capable of being the masters.

According to the structure, the evaluation values of the power allowances of the respective Bluetooth apparatuses capable of being the masters are compared with each other. Consequently, it is possible to automatically select, as the master, the Bluetooth apparatus in which a power source is stable and has an allowance, and the stagnation of the communication between devices is lessened.

An eighth aspect of the invention is directed to the Bluetooth master selecting method according to the first or second aspect of the invention, wherein the predetermined evaluating method for the evaluation information determines, as the master, a Bluetooth apparatus in which a specific value given uniquely and capable of being compared mutually is a maximum or minimum in a Bluetooth network for the respective Bluetooth apparatuses capable of being the masters.

According to the structure, in the case in which a difference in the evaluation between devices to be master candidates is small and the master cannot be determined by the evaluating method according to any of the third to seventh aspects of the invention, the Bluetooth apparatus to be the master can be defined uniquely based on the specific value of a Bluetooth device address to be uniquely given to the Bluetooth apparatus, for example.

A ninth aspect of the invention is directed to the Bluetooth master selecting method according to any of the first to eighth aspects of the invention, further comprising a step of restricting the Bluetooth apparatus capable of being the master to satisfy a predetermined condition and acquiring a Bluetooth device address of a connectable Bluetooth master apparatus in response to the inquiry request.

According to the structure, the predetermined conditions for the master are previously decided and the candidates are limited. Consequently, it is possible to shorten a processing time required for selecting the master and to relieve a processing load.

A tenth aspect of the invention is directed to the Bluetooth master selecting method according to the first or second aspect of the invention, wherein there is carried out a limitation to a device having the number of Bluetooth device address discoveries in connectable Bluetooth apparatuses of the respective Bluetooth devices capable of being the masters which is equal to or greater than a predetermined threshold, and the predetermined evaluating method for the evaluation information determines, as the master, any of the Bluetooth apparatuses which has the largest number of Bluetooth device address discoveries in the connectable Bluetooth apparatuses which are acquired by the respective Bluetooth apparatuses capable of being the masters.

According to the structure, the candidate to be the master is limited with the predetermined threshold. Consequently, it is possible to shorten the processing time required for selecting the master and to relieve the processing load.

An eleventh aspect of the invention is directed to the Bluetooth master selecting method according to the first or second aspect of the invention, wherein the predetermined evaluating method for the evaluation information determines, as the master, a Bluetooth apparatus having the largest total number of Bluetooth device address discoveries in the connectable Bluetooth apparatuses which are acquired by the respective Bluetooth apparatuses capable of being the masters.

According to the structure, the total numbers of Bluetooth device address discoveries acquired by the respective Bluetooth apparatuses capable of being the masters are compared with each other. Consequently, it is possible to automatically select, as the master, the Bluetooth apparatus having the maximum number of connections of the Bluetooth devices having a stable radio connection.

A twelfth aspect of the invention is directed to a Bluetooth master selecting program for selecting a master from a Bluetooth apparatus to build a Bluetooth network, causing a computer to execute the steps of acquiring a Bluetooth device address of a connectable Bluetooth apparatus in response to an inquiry (Inquiry), acquiring necessary evaluation information from the respective Bluetooth apparatuses having the acquired Bluetooth device addresses, and determining the Bluetooth apparatus to be a master or a slave based on a predetermined evaluating method for the evaluation information.

According to the structure, it is possible to acquire the necessary evaluation information from the other Bluetooth apparatuses to which the respective Bluetooth apparatuses capable of being the masters can be connected and to carry out the evaluation by the predetermined method, and to compare them with each other, thereby deciding whether the self-device or the other device is suitable for the master. Therefore, it is possible to automatically select, as the master, the Bluetooth apparatus having an optimum evaluation without a manual operation.

A thirteenth aspect of the invention is directed to the computer program according to the twelfth aspect of the invention, wherein the predetermined evaluating method for the evaluation information is at least one selected from a group comprising an evaluating method of determining, as the master, a Bluetooth apparatus having the largest number of Bluetooth device address discoveries of connectable Bluetooth apparatuses which are acquired by the respective Bluetooth apparatuses capable of being the masters, an evaluating method of determining, as the master, a Bluetooth apparatus having the greatest predetermined evaluation value of received signal power from the Bluetooth apparatuses to which the respective Bluetooth apparatuses capable of being the masters can be connected, an evaluating method of determining, as the master, a Bluetooth apparatus having the best predetermined evaluation value of sensitivity performance (bit error rate) by the Bluetooth apparatuses to which the respective Bluetooth apparatuses capable of being the masters can be connected, an evaluating method of determining, as the master, a Bluetooth apparatus having the greatest evaluation value of CPU allowances in the respective Bluetooth apparatuses capable of being the masters, an evaluating method of determining, as the master, a Bluetooth apparatus having the greatest evaluation value of power allowances in the respective Bluetooth apparatuses capable of being the masters, and an evaluating method of determining, as the master, a Bluetooth apparatus in which a specific value given uniquely and capable of being compared mutually is a maximum or minimum in a Bluetooth network for the respective Bluetooth apparatuses capable of being the masters.

According to the structure, the master can be selected based on at least one evaluating method selected from a plurality of evaluating methods. Also in the case in which a difference in the evaluation between the devices to be master candidates is small, therefore, it is possible to automatically select, as the master, the Bluetooth apparatus having an optimum evaluation.

A fourteenth aspect of the invention is directed to a Bluetooth apparatus for functioning as a master or a slave to build a Bluetooth network, comprising switch means for operating to start an execution of the program according to the twelfth or thirteenth aspect of the invention.

According to the structure, the Bluetooth master selecting program can be started if necessary. Consequently, it is possible to correspond to a change in a network environment.

A fifteenth aspect of the invention is directed to the Bluetooth apparatus according to the fourteenth aspect of the invention, further comprising means for displaying a self-state determined by an execution of the program according to the twelfth or thirteenth aspect of the invention.

According to the structure, it is possible to recognize, from an outside, a self-state determined by starting the Bluetooth master selecting program.

According to the invention, it is possible to acquire the necessary evaluation information from other Bluetooth apparatuses to which the respective Bluetooth apparatuses to be the masters can be connected and to carry out the evaluation by the predetermined method, and to compare them with each other, thereby deciding whether the self-device or the other device is suitable for the master. Therefore, it is possible to automatically select, as the master, the Bluetooth apparatus having an optimum evaluation without a manual operation.

BRIEF DESCRIPTION OF THE DRAWINGS

FIG. 10 is a diagram for explaining the number of Bluetooth device address discoveries and the total number of Bluetooth device address discoveries according to the first to ninth embodiments of the invention;

Figure 1:
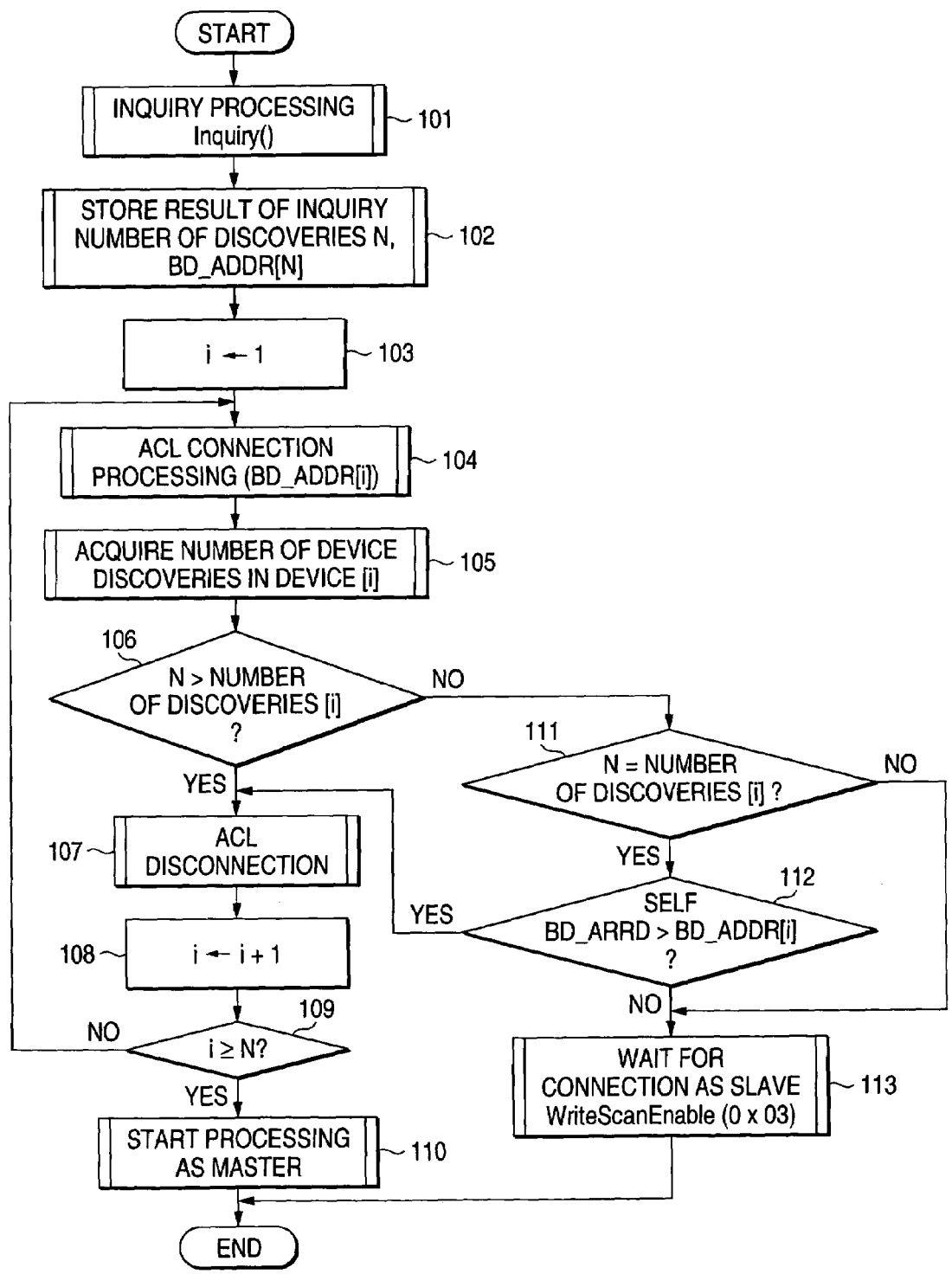
FIG. 1 is a flow chart showing an example of the processing of a Bluetooth master selecting method according to a first embodiment of the invention.

In the drawings, reference numerals 101 to 113, 210 to 217, 301 to 317, 401 to 417, 501 to 517, 601, 701 to 715, 801 to 814, 901 to 916, and 1201 to 1203 refer to "step"; 1101 refers to a "switch"; 1102 to "Bluetooth master selecting means"; and 1103 to "master/slave display means".

DETAILED DESCRIPTION OF THE PREFERRED EMBODIMENTS

Embodiments of the invention will be described below with reference to the drawings.

First Embodiment

FIG. 1 is a flow chart showing an example of the processing of a Bluetooth master selecting method according to a first embodiment of the invention. In FIG. 1, at 101, respective Bluetooth apparatuses capable of being masters first carry out an inquiry (Inquiry) to a Bluetooth device present on the periphery of a self-device by using a master function to acquire the Bluetooth device address of the Bluetooth apparatus which can be connected. In 102, the Bluetooth device address (physical address) of the Bluetooth device present on the periphery which is acquired as a result of the inquiry and the number of Bluetooth device addresses are stored as the number of Bluetooth device address discoveries.

At 103, a repetitive counter is initialized (i=1). At 104, the repetitive counter is ACL (Asynclonus Connection Less) connected to one device discovered at 101. At 105, the number of the Bluetooth device address discoveries acquired and stored at 101 by an i-th device to be a connecting partner is acquired as evaluation information for determining the Bluetooth apparatus to be the master. Subsequently, whether a self-device is a slave is evaluated based on the evaluation information thus acquired. As a result of the repetitive evaluation, if the self-device is not the slave, it finally serves as the master.

A method of acquiring the number of Bluetooth device address discoveries from the devices present on the periphery does not specify means as long as information can be acquired. A Bluetooth protocol has a hierarchical structure, and can originally create an HCI (Host Controller Interface) command by a low layer protocol, for example, and can acquire the same number as a part of serial port profile data according to an upper layer protocol.

It is decided whether a number N of Bluetooth device address discoveries of the self-device is greater than the number of Bluetooth device address discoveries of the device to be the connecting partner at 106, and it is decided whether both of the numbers of Bluetooth device address discoveries are equal to each other at 111. If the number N of Bluetooth device address discoveries of the self-device is greater than that of Bluetooth device address discoveries of the device to be the connecting partner by the comparison carried out at 106, the same device is disconnected at 107.

If both of the numbers of Bluetooth device address discoveries are equal to each other by the comparison carried out at 111, the physical address of the self-device is compared with that of the device to be the connecting partner at 112 in order to uniquely define the decision. If the physical address of the self-device is greater, the same device is disconnected at 107.

If the number N of Bluetooth device address discoveries of the self-device is smaller than the number of Bluetooth device address discoveries of the device to be the connecting partner by the comparison carried out at 111 or the physical address of the self-device is smaller by the comparison carried out at 112, the self-device is defined to be the slave at 113 and the same device waits for a connection from the master as the slave.

When the disconnection is carried out at 107, the device to be the partner thus disconnected is defined to be the slave. The repetitive counter is incremented (i+1) at 108, and the repetitive counter is compared with the number N of Bluetooth device address discoveries of the self-device at 109. Consequently, it is decided whether all of comparisons with connectable devices are completed. If all of the comparisons are not completed, the processing returns to 104. If the self-device is not defined to be the slave after all of the comparisons are completed, the self-device is defined to be the master and a processing for the master is started at 110.

Each device carries out the above processings to define, as the master, a device having the largest number of connectable devices. If a plurality of devices has the largest number of connectable devices, moreover, any of the devices which has a greater physical address is defined to be the master. While the master is uniquely defined by the comparison of the physical address, any method capable of uniquely defining either the master or the slave can be employed.

Figure 14:
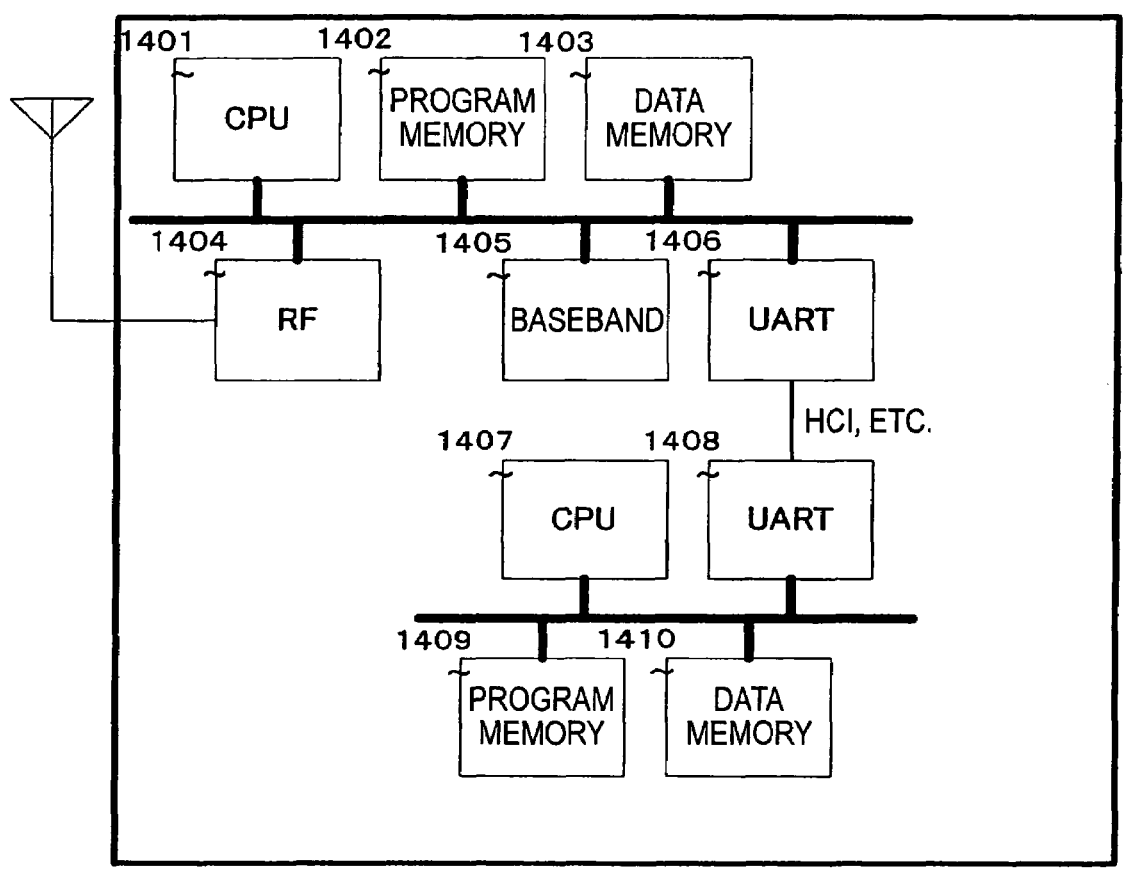
FIG. 14 is a block diagram showing an example of the structure of a Bluetooth apparatus for executing the Bluetooth master selecting method according to the invention.

FIG. 14 is a block diagram showing an example of the structure of a Bluetooth apparatus for executing the Bluetooth master selecting method according to each of the embodiments of the invention. In FIG. 14, 1401 denotes a controller CPU for carrying out a baseband control and an interface control with a host CPU, 1402 denotes a program memory for storing the program of the controller CPU 1401, 1403 denotes a data memory for storing the data of the controller CPU 1401, 1404 denotes an RF circuit for carrying out a radio processing, 1405 denotes a baseband circuit for carrying out a communication control, 1407 denotes a host CPU for processing a host protocol communication and an application, 1406 and 1408 denote a UART circuit for carrying out a communication with the controller CPU 1401 and the host CPU 1407, 1409 denotes a program memory for storing the program of the host CPU 1407, and 1410 denotes a data memory for storing the data of the host CPU 1407. A program for executing the Bluetooth master selecting method according to the invention is stored in the program memory 1409 and is executed by the host CPU 1407.

By excluding 1406 to 1410 from the structure of FIG. 14, moreover, it is also possible to constitute a simple type Bluetooth apparatus by only 1401 to 1404. In that case, the program for executing the Bluetooth master selecting method according to the invention is stored in the program memory 1402 and is executed by the controller CPU 1401.

It is also possible to employ a structure in which a CPU is further added to the structure of FIG. 14 to execute the application processing. However, the program for executing the Bluetooth master selecting method according to the invention may be executed by any CPU, and an advantage thereof does not depend on the structure of the CPU. It is apparent that this is the same also in each of the embodiments which will be described below.

According to the Bluetooth master selecting method in accordance with the embodiment, thus, the numbers of Bluetooth device address discoveries which are acquired by the respective Bluetooth apparatuses capable of being the masters are compared with each other. Consequently, it is possible to automatically select, as the master, the Bluetooth device having the largest number of connected devices without a manual operation.

Second Embodiment

Figure 2:
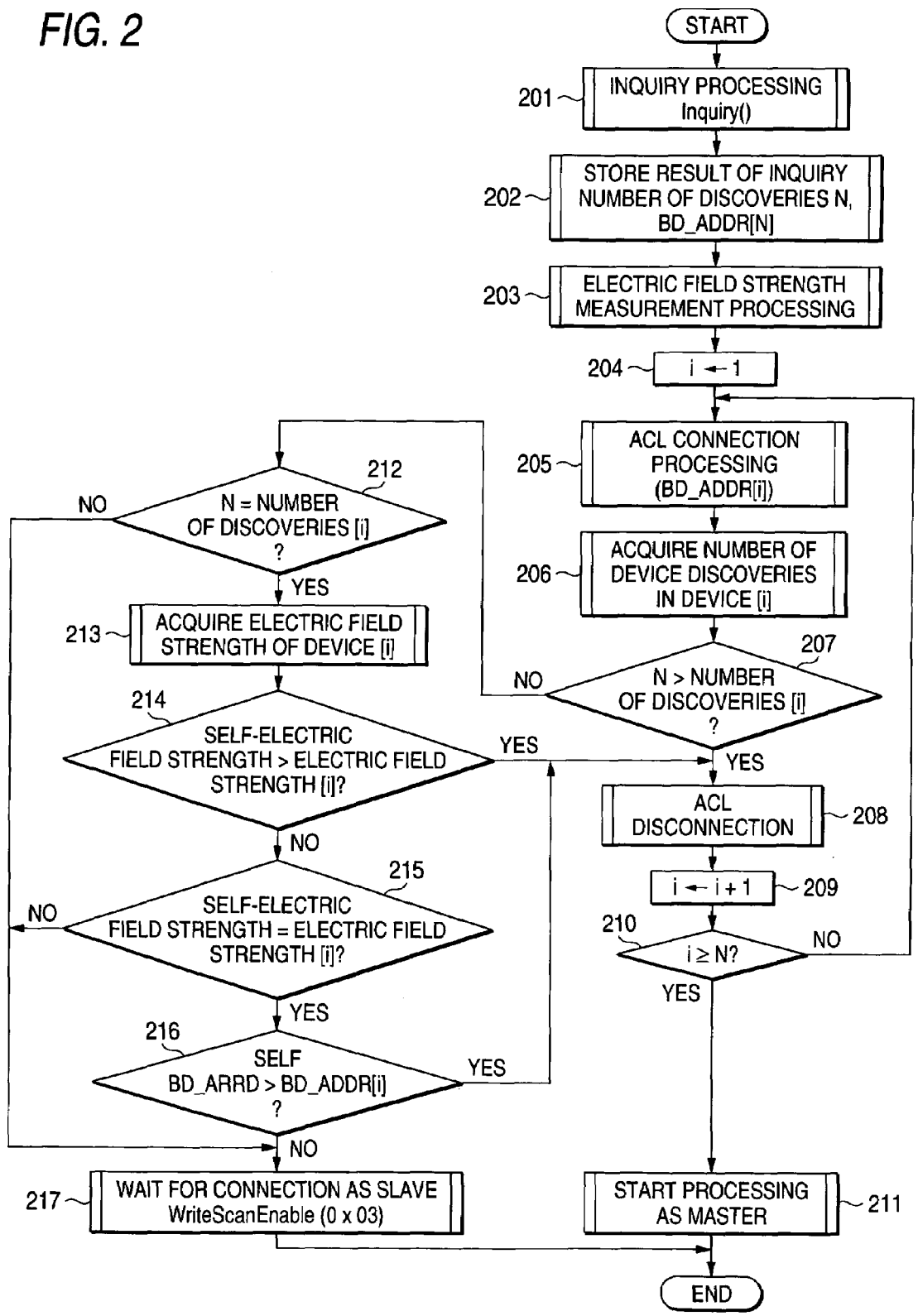
FIG. 2 is a flow chart showing an example of the processing of a Bluetooth master selecting method according to a second embodiment of the invention.

FIG. 2 is a flow chart showing an example of the processing of a Bluetooth master selecting method according to a second embodiment of the invention. In FIG. 2, at 201, respective Bluetooth apparatuses capable of being masters first give an inquiry (Inquiry) to a Bluetooth device present on the periphery of a self-device by using a master function, thereby acquiring the Bluetooth device address of the Bluetooth apparatus which can be connected. In 202, the Bluetooth device address (physical address) of the Bluetooth apparatus present on the periphery which is acquired as a result of the inquiry and the number of the Bluetooth device addresses are stored as the number of Bluetooth device address discoveries.

At 203, the electric field strengths of radio waves received from all of the Bluetooth devices capable of being connected are measured to calculate a predetermined evaluation value. The evaluation value may be the sum of the electric field strengths of the radio waves received from the Bluetooth devices or may be obtained by carrying out a predetermined calculation processing over each of the electric field strengths. For example, a method of carrying out a highlight processing such as a square calculation over each electric field strength and then summing the electric field strengths can also produce excellent advantages.

At 204, a repetitive counter is initialized (i=1). At 205, the repetitive counter is ACL connected to one device discovered at 201. At 206, the number of Bluetooth device address discoveries acquired and stored at 201 by an i-th device to be a connecting partner is acquired.

It is decided whether the number N of Bluetooth device address discoveries of a self-device is greater than the number of Bluetooth device address discoveries of the device to be the connecting partner at 207, and it is decided whether both of the numbers of Bluetooth device address discoveries are equal to each other at 212. If the number N of Bluetooth device address discoveries of the self-device is greater than that of Bluetooth device address discoveries of the device to be the connecting partner by the comparison carried out at 207, the same device is disconnected at 208.

If both of the numbers of Bluetooth device address discoveries are equal to each other by the comparison carried out at 212, the processing proceeds to 213 in which the predetermined evaluation value of the electric field strength measured and evaluated at 203 in the i-th device to be the connecting partner is acquired as second evaluation information for determining the Bluetooth apparatus to be the master.

At 214, it is decided whether the evaluation value of the electric field strength of the self-device is greater than that of the electric field strength of the device to be the connecting partner. At 215, it is decided whether both of the evaluation values of the electric field strengths are equal to each other. If the evaluation value of the electric field strength of the self-device is greater than that of the electric field strength of the device to be the connecting partner by the comparison carried out at 214, the same device is disconnected at 208.

If both of the numbers of Bluetooth device address discoveries are equal to each other by the comparison carried out at 215, the physical address of the self-device is compared with that of the device to be the connecting partner at 216 in order to uniquely define a decision. If the physical address of the self-device is greater, the same device is disconnected at 208.

If the number N of Bluetooth device address discoveries of the self-device is smaller than the number of Bluetooth device address discoveries of the device to be the connecting partner by the comparison carried out at 212, the evaluation value of the electric field strength of the self-device is smaller than that of the electric field strength of the device to be the connecting partner by the comparison carried out at 215 or the physical address of the self-device is smaller by the comparison carried out at 216, the self-device is defined to be the slave at 217 and the same device waits for a connection from the master as the slave.

When the disconnection is carried out at 208, the device to be the partner thus disconnected is defined to be the slave. The repetitive counter is incremented (i+1) at 209, and the repetitive counter is compared with the number N of Bluetooth device address discoveries of the self-device at 210. Consequently, it is decided whether all of the comparisons with connectable devices are completed. If all of the comparisons are not completed, the processing returns to 205. If the self-device is not defined to be the slave after all of the comparisons are completed, the self-device is defined to be the master and a processing for the master is started at 211.

Each device carries out the above processings to define, as the master, a device having the largest number of connectable devices. If a plurality of devices has the largest number of connectable devices, any of the devices which has a greater evaluation value of the electric field strength is defined to be the master. If a plurality of devices is adapted to the evaluation in two stages, the master is defined by a method capable of carrying out a unique definition such as a physical address.

According to the Bluetooth master selecting method in accordance with the embodiment, thus, the numbers of Bluetooth device address discoveries which are acquired by the respective Bluetooth apparatuses capable of being the masters, and the evaluation values of the electric field strengths are compared with each other, respectively. Consequently, it is possible to automatically select, as the master, a Bluetooth device having the largest number of connected devices and a great radio connecting strength.

Third Embodiment

Figure 3:
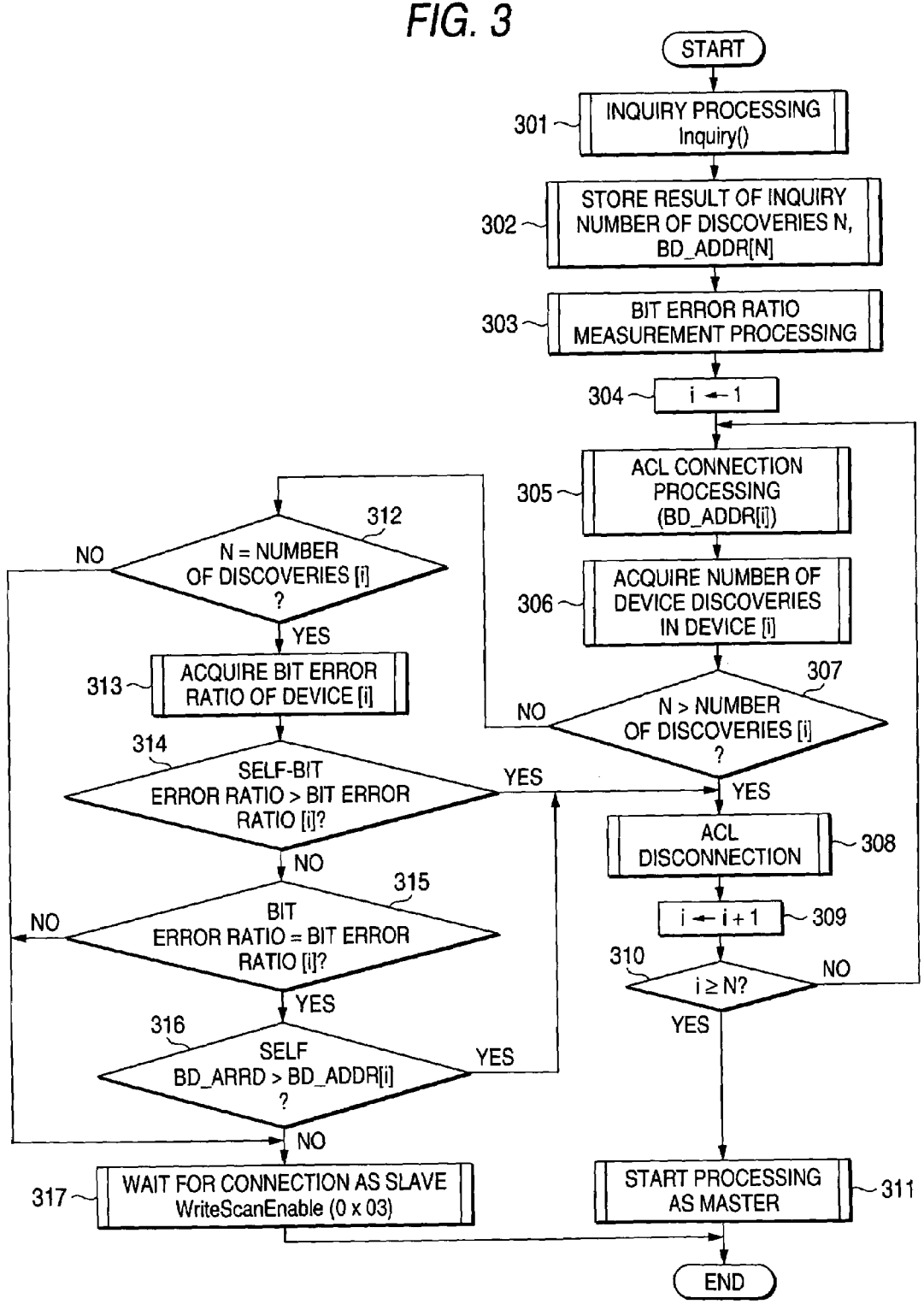
FIG. 3 is a flow chart showing an example of the processing of a Bluetooth master selecting method according to a third embodiment of the invention.

FIG. 3 is a flow chart showing an example of the processing of a Bluetooth master selecting method according to a third embodiment of the invention. In FIG. 3, steps obtained by excluding steps 303 and 313 to 315 from steps 301 to 317 correspond to the steps obtained by excluding the steps 203 and 213 to 215 from the steps 201 to 217 in FIG. 2 according to the second embodiment in order, and the contents of processings are the same as those of the corresponding steps. Therefore, each description will be omitted.

In the third embodiment, the predetermined evaluation value of a bit error ratio in a signal received from a Bluetooth device to which respective Bluetooth devices capable of being masters can be connected is used in place of the evaluation value of the electric field strength in the second embodiment, and a processing is carried out in such a manner as to set, as the master, a Bluetooth device having the best evaluation value.

More specifically, sensitivity performance in signals received from all of the connectable Bluetooth devices are measured to calculate a predetermined evaluation value at 303. The evaluation value may be the sum of the sensitivity performance (bit error rate) from the respective Bluetooth devices or may be obtained by carrying out a predetermined calculation processing over each of the bit error rate.

At 313, moreover, if the numbers of Bluetooth device address discoveries are equal to each other by a comparison carried out at 312, the predetermined evaluation value of a bit error ratio which is measured and evaluated at 303 by an i-th device to be a connecting partner is acquired as second evaluation information for determining the Bluetooth device to be the master.

Furthermore, 314 denotes a step of deciding whether the evaluation value of the bit error ratio of a self-device is smaller than that of the bit error ratio of a device to be a connecting partner, and 315 denotes a step of deciding whether both of the evaluation values of the bit error rate are equal to each other.

In the same manner as in the second embodiment, each device carries out the above processings to define, as the master, a device having the largest number of connectable devices. If a plurality of devices has the largest number of connectable devices, any of the devices which has the best evaluation value of the bit error ratio is defined to be the master. If a plurality of devices is adapted to the evaluation in two stages, the master is defined by a method capable of carrying out a unique definition such as a physical address.

According to the Bluetooth master selecting method in accordance with the embodiment, thus, the numbers of Bluetooth device address discoveries which are acquired by the respective Bluetooth apparatuses capable of being the masters, and the evaluation values of the bit error rate are compared with each other, respectively. Consequently, it is possible to automatically select, as the master, the Bluetooth device having the largest number of connected devices and a great radio communication error.

Fourth Embodiment

Figure 4:
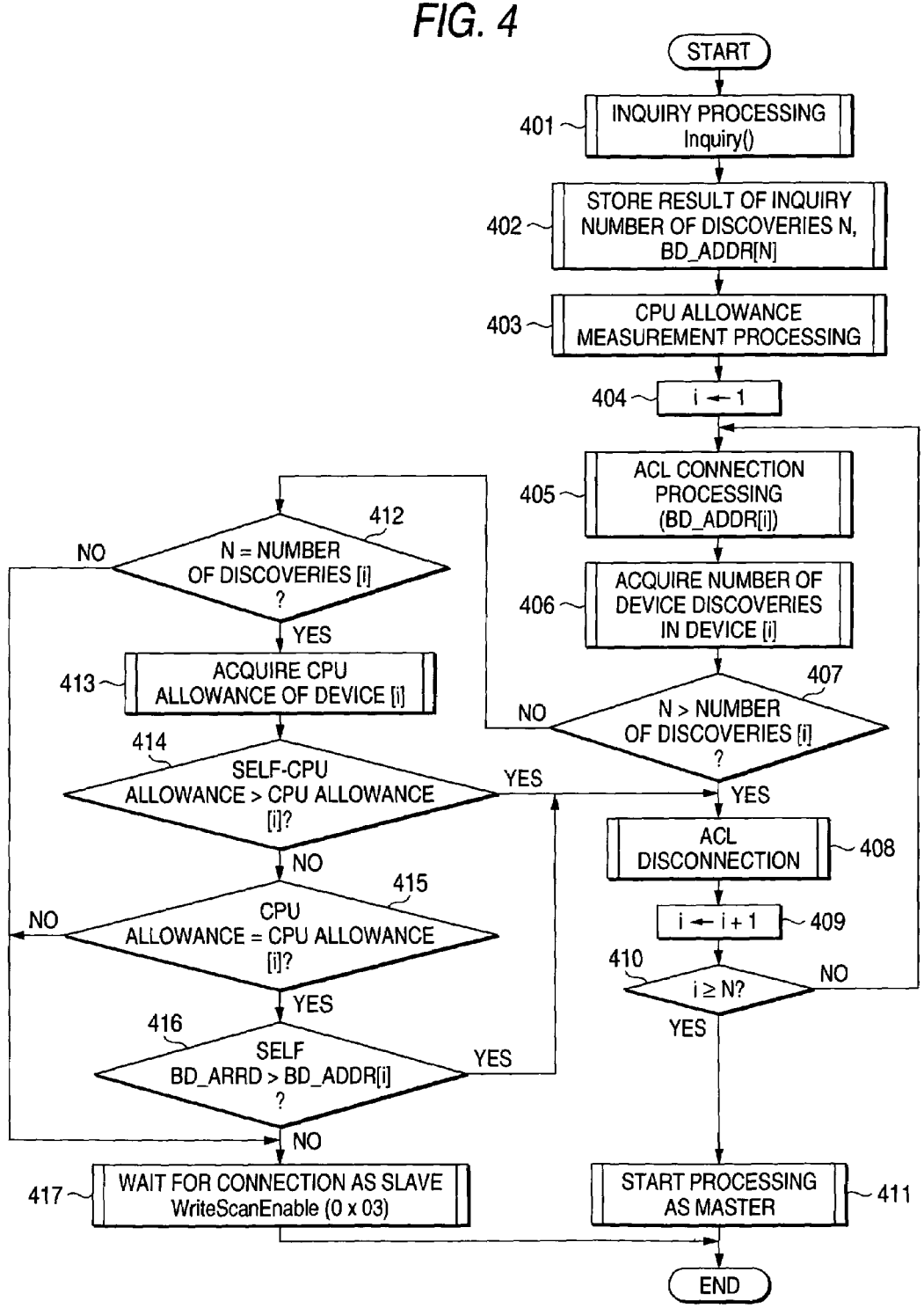
FIG. 4 is a flow chart showing an example of the processing of a Bluetooth master selecting method according to a fourth embodiment of the invention.

FIG. 4 is a flow chart showing an example of the processing of a Bluetooth master selecting method according to a fourth embodiment of the invention. In FIG. 4, steps obtained by excluding steps 403 and 413 to 415 from steps 401 to 417 correspond to the steps obtained by excluding the steps 203 and 213 to 215 from the steps 201 to 217 in FIG. 2 according to the second embodiment in order, and the contents of processings are the same as those of the corresponding steps. Therefore, each description will be omitted.

In the fourth embodiment, the evaluation values of CPU allowances in respective Bluetooth devices capable of being masters are used in place of the evaluation value of the electric field strength in the second embodiment, and a processing is carried out in such a manner as to set, as the master, any of the Bluetooth devices which has the greatest evaluation value.

More specifically, at 403, each of the Bluetooth devices capable of being the masters calculates the evaluation value of the CPU allowance of a self-device by a predetermined evaluating method. The evaluation value of the CPU allowance is calculated by a predetermined method according to measurement data on the idle time of a CPU or data on a throughput which are previously obtained.

At 413, moreover, if the numbers of Bluetooth device address discoveries are equal to each other by a comparison carried out at 412, the evaluation value of the CPU allowance which is evaluated at 403 by an i-th device to be a connecting partner is acquired as second evaluation information for determining the Bluetooth device to be the master.

Furthermore, 414 denotes a step of deciding whether the evaluation value of the CPU allowance of a self-device is greater than that of the CPU allowance of a device to be a connecting partner, and 415 denotes a step of deciding whether both of the evaluation values of the CPU allowances are equal to each other.

In the same manner as in the second embodiment, each device carries out the above processings to define, as the master, a device having the largest number of connectable devices. If a plurality of devices has the largest number of connectable devices, any of the devices which has the greatest evaluation value of the CPU allowance is defined to be the master. If a plurality of devices is adapted to the evaluation in two stages, the master is defined by a method capable of carrying out a unique definition such as a physical address.

According to the Bluetooth master selecting method in accordance with the embodiment, thus, the numbers of Bluetooth device address discoveries which are acquired by the respective Bluetooth apparatuses capable of being the masters, and the evaluation values of the CPU allowances are compared with each other, respectively. Consequently, it is possible to automatically select, as the master, a Bluetooth device having the largest number of connected devices and less stagnation of a communication between the devices.

Fifth Embodiment

Figure 5:
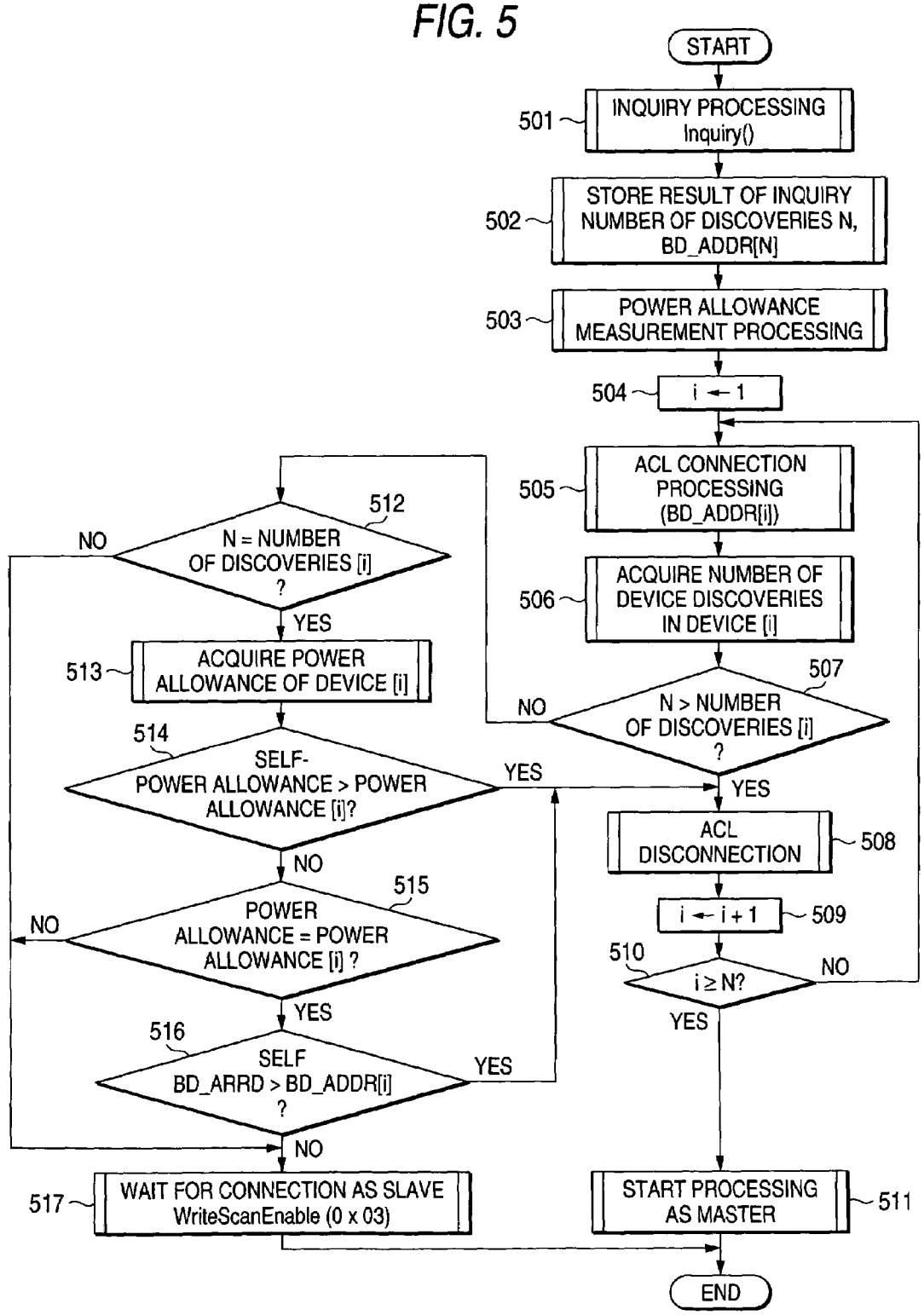
FIG. 5 is a flow chart showing an example of the processing of a Bluetooth master selecting method according to a fifth embodiment of the invention.

FIG. 5 is a flow chart showing an example of the processing of a Bluetooth master selecting method according to a fifth embodiment of the invention. In FIG. 5, steps obtained by excluding steps 503 and 513 to 515 from steps 501 to 517 correspond to the steps obtained by excluding the steps 203 and 213 to 215 from the steps 201 to 217 in FIG. 2 according to the second embodiment in order, and the contents of processings are the same as those of the corresponding steps. Therefore, each description will be omitted.

In the fifth embodiment, the evaluation values of power allowances in respective Bluetooth devices capable of being masters are used in place of the evaluation value of the electric field strength in the second embodiment, and a processing is carried out in such a manner as to set, as the master, any of the Bluetooth devices which has the greatest evaluation value.

More specifically, at 503, each of the Bluetooth devices capable of being the masters calculates the evaluation value of the power allowance of a self-device by a predetermined evaluating method. The evaluation value of the power allowance is calculated by a predetermined method according to the measurement of the amount of residue of a battery and data on a power capacity which are previously obtained. In case of an AC power supply, moreover, the evaluation value is set to be a maximum value.

At 513, moreover, if both of the numbers of Bluetooth device address discoveries are equal to each other by a comparison carried out at 512, the evaluation value of the power allowance which is evaluated at 503 by an i-th device to be a connecting partner is acquired as second evaluation information for determining the Bluetooth device to be the master.

Furthermore, 514 denotes a step of deciding whether the evaluation value of the power allowance of a self-device is greater than that of the power allowance of a device to be a connecting partner, and 515 denotes a step of deciding whether both of the evaluation values of the power allowances are equal to each other.

In the same manner as in the second embodiment, each device carries out the above processings to define, as the master, a device having the largest number of connectable devices. If a plurality of devices has the largest number of connectable devices, any of the devices which has the greatest evaluation value of the power allowance is defined to be the master. If a plurality of devices is adapted to the evaluation in two stages, the master is defined by a method capable of carrying out a unique definition such as a physical address.

According to the Bluetooth master selecting method in accordance with the embodiment, thus, the numbers of Bluetooth device address discoveries which are acquired by the respective Bluetooth apparatuses capable of being the masters, and the evaluation values of the power allowances are compared with each other, respectively. Consequently, it is possible to automatically select, as the master, the Bluetooth device having the largest number of connected devices and less stagnation of a communication between the devices.

Sixth Embodiment

Figure 6:
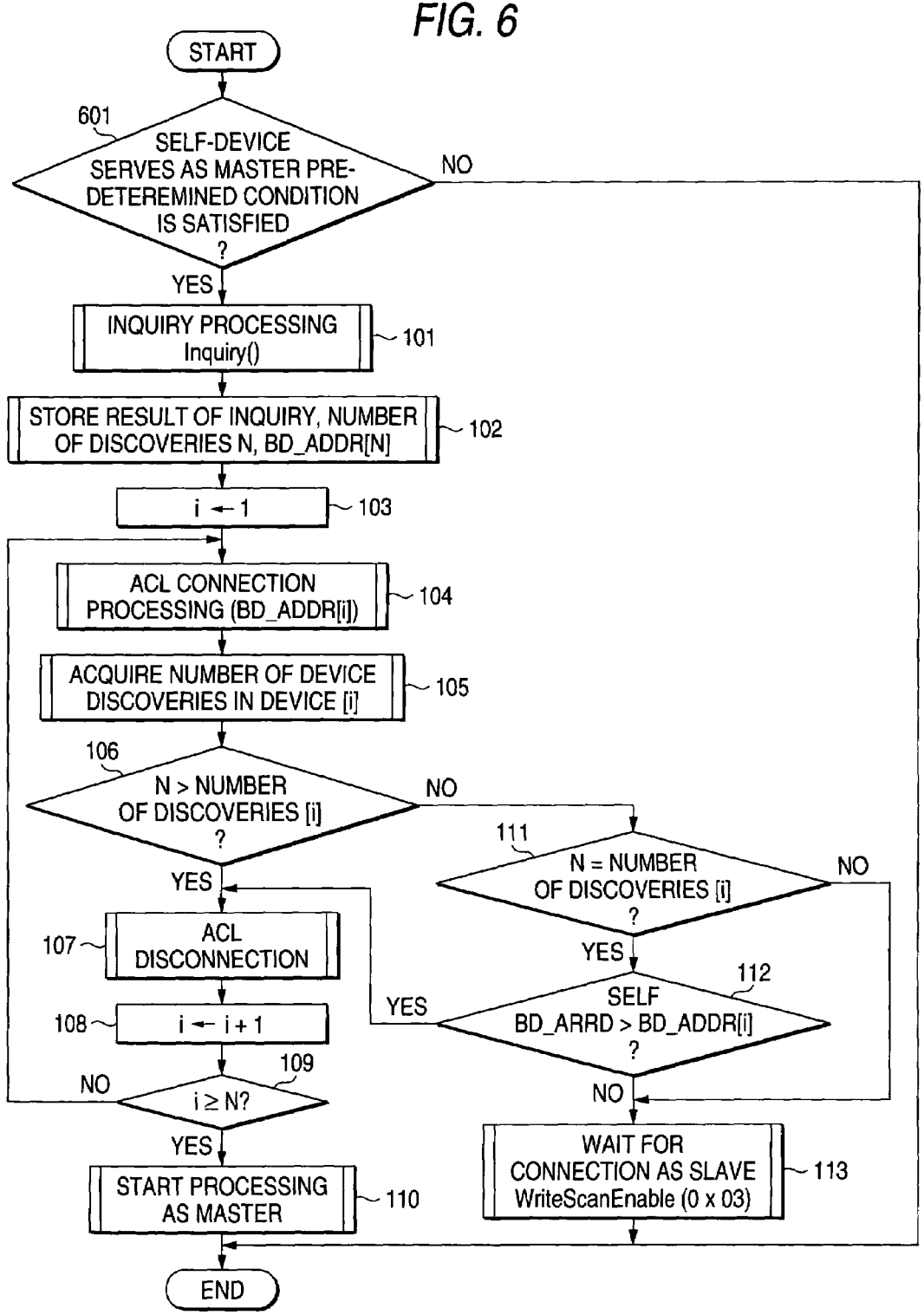
FIG. 6 is a flow chart showing an example of the processing of a Bluetooth master selecting method according to a sixth embodiment of the invention.

FIG. 6 is a flow chart showing an example of the processing of a Bluetooth master selecting method according to a sixth embodiment of the invention. In FIG. 6, steps 101 to 113 except for a step 601 are identical to the steps 101 to 113 in FIG. 1 respectively, and the contents of processings are the same as those of the first embodiment. Therefore, each description will be omitted.

In the sixth embodiment, it is decided whether a self-device satisfies a predetermined condition for a master at 601. If the condition is satisfied, subsequent processings are executed in the same manner as in the first embodiment. If the condition is not satisfied, the self-device is defined as a slave to wait for a connection from the master as the slave at 113.

The predetermined condition to be decided at 601 includes a condition related to the stability of a power supply as to whether the power supply of a self-device is a battery or an AC power supply, a condition related to a CPU throughput as to whether a host CPU is an 8-bit microcomputer or a 32-bit microcomputer or a condition related to the attribute of a Bluetooth device that the slave becomes only a slave under the restriction of an LSI which is proper or used because the device can be moved. Moreover, limitations on the number of connectable Bluetooth device address discoveries and the Bluetooth device address are effective. In that case, the step 601 is to be placed after the step 103.

According to the Bluetooth master selecting method in accordance with the embodiment, thus, it is possible to shorten a time required for a processing in the Bluetooth master selecting method and to relieve a processing load by previously deciding a predetermined condition for the master and restricting a candidate.

While the step 601 is added to the first embodiment in the embodiment, it is possible to obtain the same advantages by adding the step 601 to the second to fifth embodiments in the same manner.

Seventh Embodiment

Figure 7:
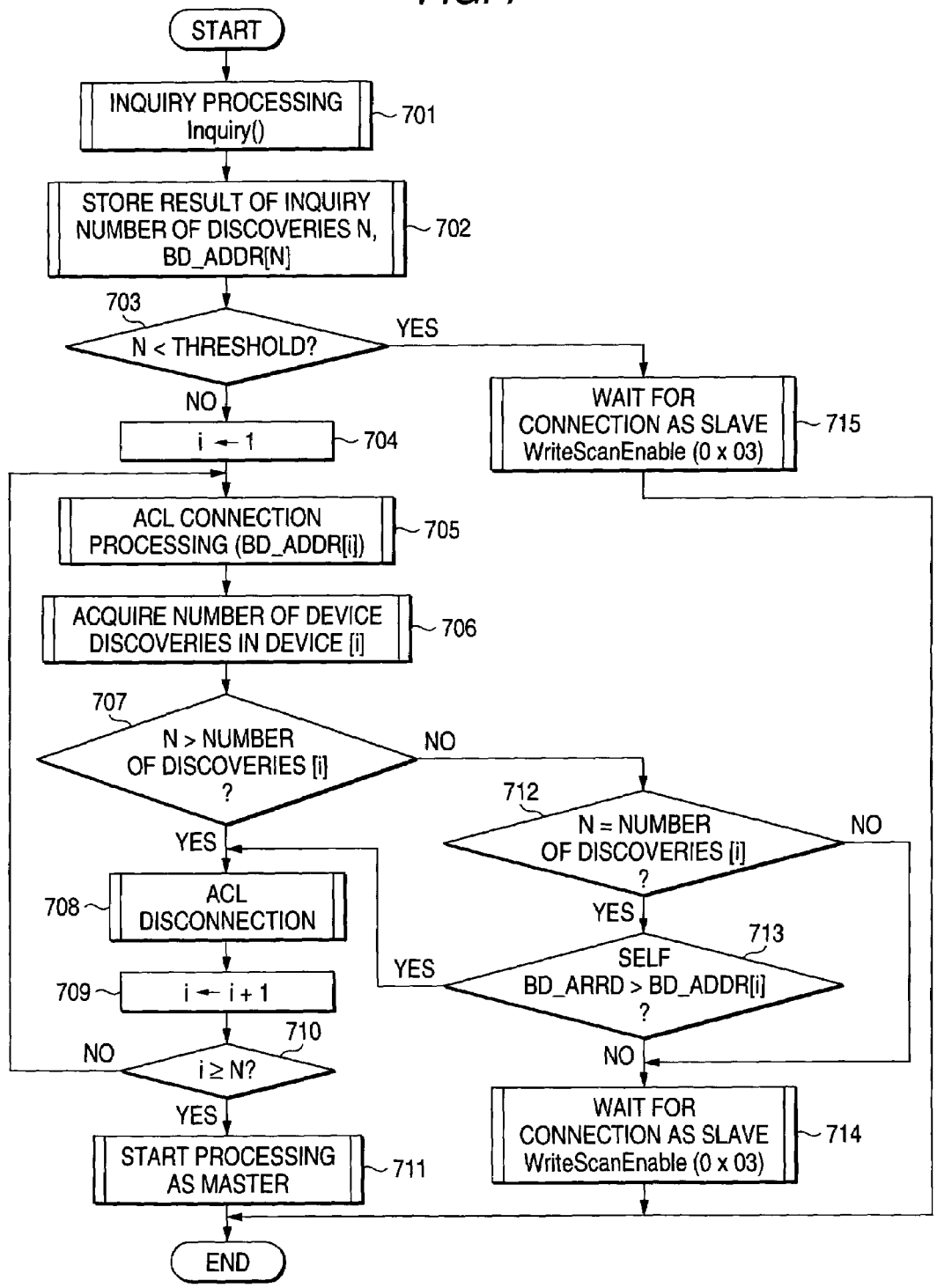
FIG. 7 is a flow chart showing an example of the processing of a Bluetooth master selecting method according to a seventh embodiment of the invention.

FIG. 7 is a flow chart showing an example of the processing of a Bluetooth master selecting method according to a seventh embodiment of the invention. In FIG. 7, steps 701, 702 and 704 to 714 obtained by excluding steps 703 and 715 correspond to the steps 101 to 113 of FIG. 1 according to the first embodiment in order, and the contents of processings are the same as those of the corresponding steps. Therefore, each description will be omitted.

In the seventh embodiment, the number N of Bluetooth device address discoveries in a Bluetooth apparatus to which a self-device can be connected is compared with a predetermined threshold at 703. If the number N of Bluetooth device address discoveries in the Bluetooth apparatus to which the self-device can be connected is greater than or equal to the predetermined threshold, subsequent processings are executed in the same manner as those in 103 to 113 according to the first embodiment. If the same number N is smaller than the predetermined threshold, the self-device is defined as a slave to wait for a connection from a master as the slave at 715.

According to the Bluetooth master selecting method in accordance with the embodiment, thus, it is possible to shorten a time required for a processing in the Bluetooth master selecting method and to relieve a processing load by comparing the number of Bluetooth device address discoveries in the Bluetooth apparatus to which the self-device can be connected with the predetermined threshold.

Eighth Embodiment

Figure 8:
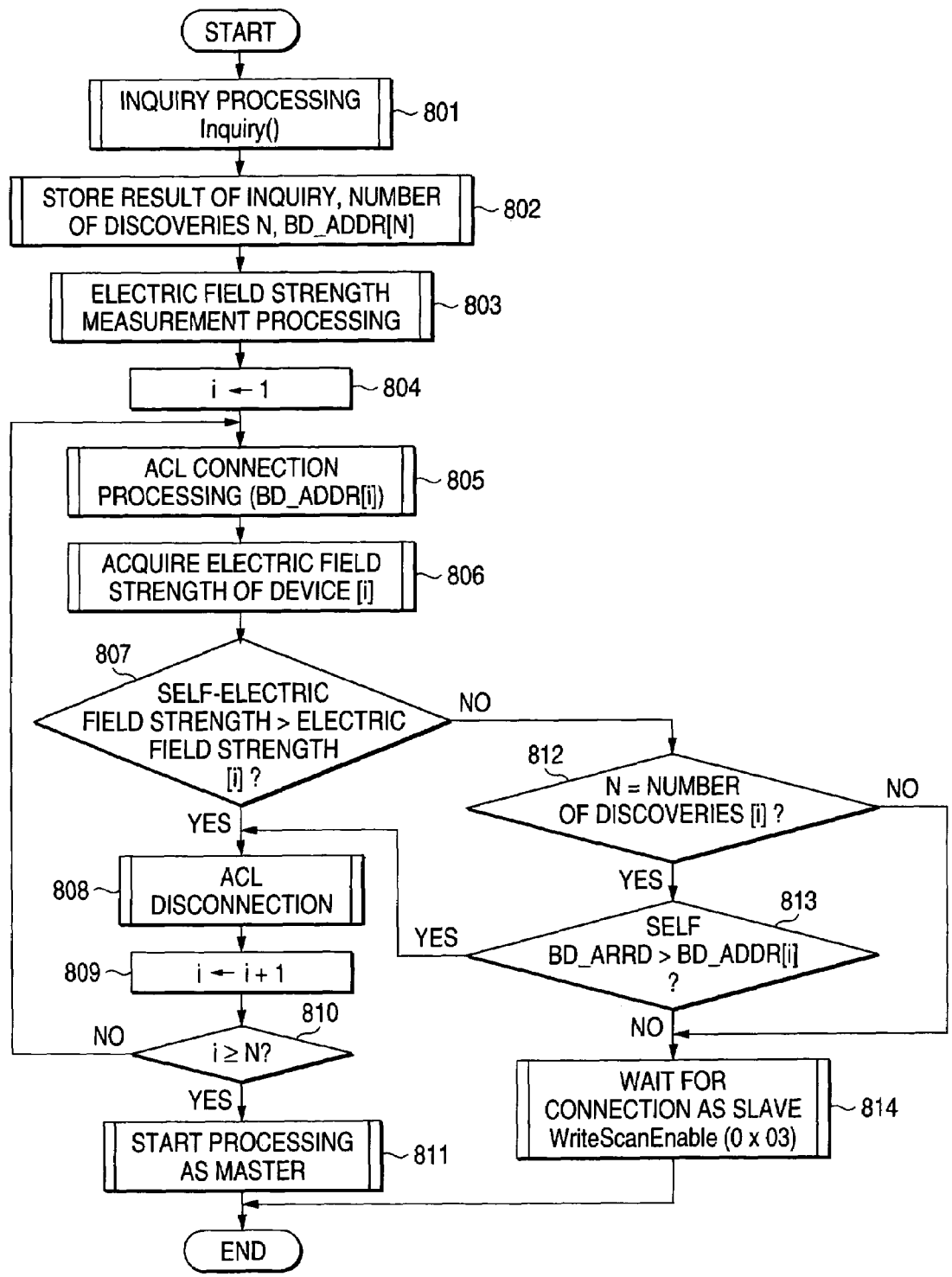
FIG. 8 is a flow chart showing an example of the processing of a Bluetooth master selecting method according to an eighth embodiment of the invention.

FIG. 8 is a flow chart showing an example of the processing of a Bluetooth master selecting method according to an eighth embodiment of the invention. In FIG. 8, steps obtained by excluding steps 803, 805 and 806 correspond to the steps obtained by excluding the steps 105 and 106 of FIG. 1 according to the first embodiment in order, and the contents of processings are the same as those of the corresponding steps. Therefore, each description will be omitted.

In the eighth embodiment, the evaluation values of electric field strengths in respective Bluetooth apparatuses capable of being masters are used in place of the number of Bluetooth device address discoveries in the Bluetooth apparatus to which a self-device can be connected according to the first embodiment, and a processing is carried out in such a manner as to select, as the master, any of the Bluetooth devices which has the greatest evaluation value.

More specifically, at 803, the electric field strengths of radio waves received from all of the Bluetooth devices capable of being connected are measured to calculate a predetermined evaluation value.

At 806, moreover, the predetermined evaluation value of the electric field strength which is measured and evaluated at 803 by an i-th device to be a connecting partner is acquired.

Furthermore, 807 denotes a step of deciding whether the evaluation value of the electric field strength of the self-device is greater than that of the electric field strength of a device to be a connecting partner.

Each device carries out the above processings in the same manner as in the first embodiment so that a device having the greatest evaluation value of the electric field strength is defined to be the master. In the case in which there is a plurality of devices having the largest number of connectable devices, moreover, any of the devices which has a greater physical address is defined to be the master. While the master is uniquely defined based on the comparison of the physical address, it is also possible to employ any method capable of uniquely defining any of the devices.

According to the Bluetooth master selecting method in accordance with the embodiment, thus, it is possible to automatically select, as the master, a Bluetooth device having a great radio strength without a manual operation by comparing the evaluation values of the electric field strengths acquired by the respective Bluetooth apparatuses capable of being the masters with each other. For this method, a method of comparing evaluation values other than the number of device discoveries is useful when the number of device discoveries is not an important condition because of a small house.

Ninth Embodiment

Figure 9:
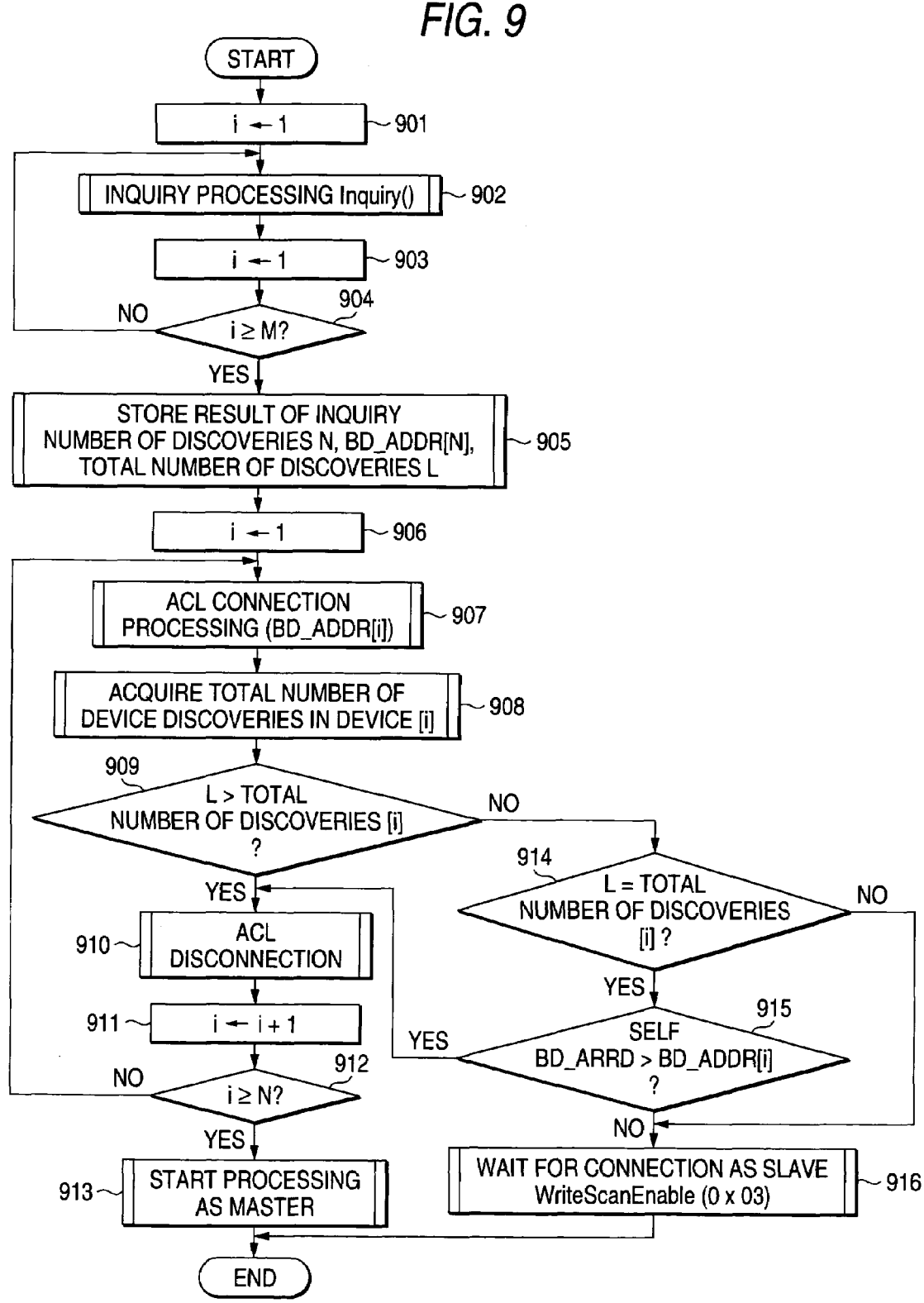
FIG. 9 is a flow chart showing an example of the processing of a Bluetooth master selecting method according to a ninth embodiment of the invention.

FIG. 9 is a flow chart showing an example of the processing of a Bluetooth master selecting method according to a ninth embodiment of the invention. In FIG. 9, steps obtained by excluding steps 901 to 905, 908, 909 and 914 correspond to the steps obtained by excluding the steps 101, 105, 106 and 111 of FIG. 1 according to the first embodiment in order, and the contents of processings are the same as those of the corresponding steps. Therefore, each description will be omitted.

In the ninth embodiment, the evaluation value of the total number of device discoveries is used in place of the number of device discoveries in the first embodiment, and a processing is carried out in such a manner as to select, as a master, any of the devices which has the greatest evaluation value.

More specifically, a repetitive counter is initialized (i=1) at 901, and respective Bluetooth apparatuses capable of being the masters give an inquiry (Inquiry) to the Bluetooth devices present on the periphery of a self-device by using a master function to acquire the Bluetooth device addresses of the connectable Bluetooth apparatuses at 902. At 903, the repetitive counter is incremented (i+1). At 904, the repetitive counter is compared with a predetermined inquiry repetition number M to decide whether an inquiry about the predetermined repetition number is executed or ended. If the inquiry about the predetermined number of times is not ended, the processing returns to 902. If the inquiry about the predetermined number of times is ended, the Bluetooth device address (physical address) of the Bluetooth apparatus present on the periphery which is acquired based on the results of the inquiries given at plural times and the total number of Bluetooth device address discoveries are stored as the total number of Bluetooth device address discoveries.

At 908, moreover, the total number of Bluetooth device address discoveries is acquired as evaluation information for determining the Bluetooth device to be the master from one device which is ACL connected at 907. At 909, it is decided whether a total number L of Bluetooth device address discoveries of a self-device is larger than the total number of Bluetooth device address discoveries of a device to be a connecting partner. At 914, it is decided whether both of the total numbers of Bluetooth device address discoveries are equal to each other.

Each device carries out the above processings in the same manner as in the first embodiment so that a device having the largest total number of connectable devices is defined to be the master. In the case in which there is a plurality of devices adapted to the evaluation, the master is defined by a method capable of uniquely carrying out a definition such as a physical address.

Figure 13:
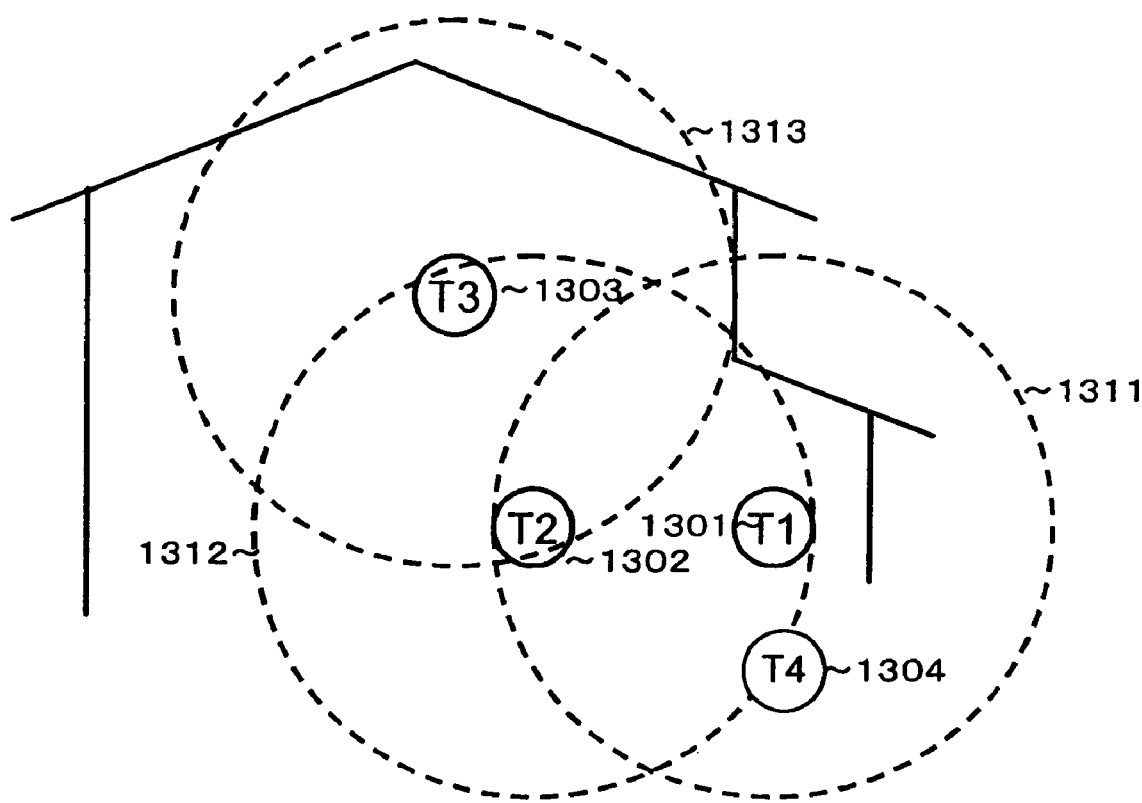
FIG. 13 is a diagram for explaining a state in which an electric appliance builds a Bluetooth network.

FIG. 10 is a diagram for explaining, with reference to an example, the number of Bluetooth device address discoveries in connectable Bluetooth devices and the total number of Bluetooth device address discoveries in response to an inquiry at plural times which is given by the respective Bluetooth devices capable of being the masters according to the invention. 1001 denotes a table showing the result of an inquiry of a Bluetooth device T1 (1301) in FIG. 13, and 1002 denotes a table showing the result of an inquiry of a Bluetooth device T2 (1302) in FIG. 13. In the tables 1001 and 1002, a column indicates a Bluetooth device capable of being connected and a row indicates the number of inquiries, and a square in the table describes, as ○, the case in which the Bluetooth device represented by the column can be discovered at an inquiry number represented by the row, and describes, as X, the case in which the Bluetooth device cannot be discovered.

In FIG. 13, the Bluetooth device T1 (1301) is present in the radio communication regions of Bluetooth devices T2 (1302) and T4 (1304) comparatively close thereto, and is present on the outside of the radio communication region of a Bluetooth device T3 (1303). On the other hand, the Bluetooth device T2 (1302) is present in the radio communication regions of the Bluetooth devices T1 (1301), T3 (1303) and T4 (1304) comparatively distantly therefrom. In the example of FIG. 10, As a result of the inquiry of the Bluetooth device T1 (1301) in 1001, the Bluetooth devices T2 (1302) and T4 (1304) are successfully discovered completely from first to third times, and the Bluetooth device T3 (1303) cannot be discovered at all from the first to third times. Under the circumstances, the number of Bluetooth device address discoveries is two because the Bluetooth devices T2 (1302) and T4 (1304) can be discovered. Since the Bluetooth devices T2 (1302) and T4 (1304) can be discovered completely from the first to third times, the total number of Bluetooth device address discoveries is obtained to be six in such a way as to count ○. In 1002, similarly, the number of Bluetooth device address discoveries is three and the total number of Bluetooth device address discoveries is five.

In the case in which the number of Bluetooth device address discoveries has priority as in the first embodiment, the Bluetooth device T2 (1302) serves as the master. In the case in which the total number of Bluetooth device address discoveries has priority as in the ninth embodiment, the Bluetooth device T1(1301) serves as the master.

According to the Bluetooth master selecting method in accordance with the embodiment, thus, it is possible to automatically select, as the master, the Bluetooth device having the largest number of connected devices setting a stable radio connecting condition without a manual operation by comparing the total numbers of Bluetooth device address discoveries in the connectable Bluetooth apparatuses which are acquired by the respective Bluetooth apparatuses capable of being the masters with each other. This method is useful for meeting both requirements for stabilizing a radio connection and connecting more devices if possible in the case in which a large number of connectable devices are present and a device having an indefinite radio connection is present because a house is very large.

Tenth Embodiment

Figure 11:
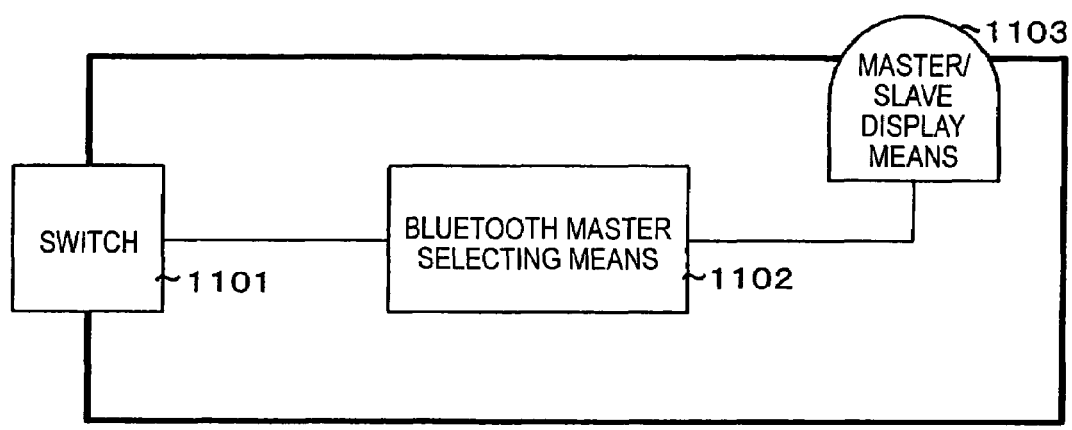
FIG. 11 is a block diagram showing an example of the structure of a Bluetooth apparatus according to a tenth embodiment of the invention.

FIG. 11 is a block diagram showing an example of the structure of a Bluetooth apparatus according to a tenth embodiment of the invention. In FIG. 11, 1102 denotes Bluetooth master selecting means for executing a master/slave selection processing, 1101 denotes switch means for operating to start the execution, and 1103 denotes master/slave display means for displaying a state in which a self-device is determined as a master or a slave or is determined as neither the master nor the slave.

Figure 12:
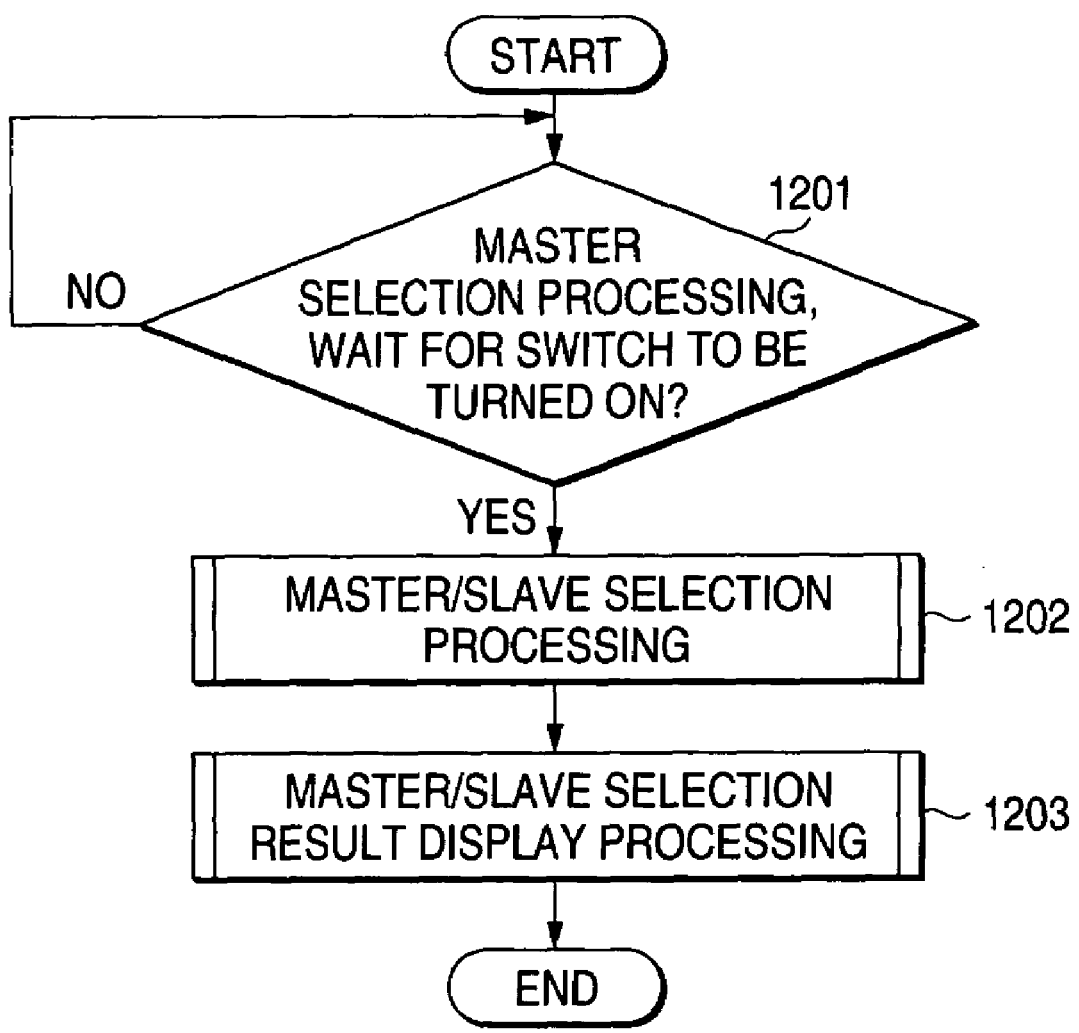
FIG. 12 is a flow chart for explaining the operation of the Bluetooth apparatus according to the tenth embodiment of the invention.

FIG. 12 is a flow chart for explaining the operation of the Bluetooth apparatus shown in FIG. 11. In FIG. 12, at 1201, the switch 1101 is monitored to wait for an operation to start the execution of the master/slave selection processing. In place of the operation of the switch 1101, the power supply of the Bluetooth apparatus may be turned on as an execution starting command. For the switch 1101, moreover, a unit to be manually operated by a user may be employed, and furthermore, the control results of other devices or components may be used.

1202 indicates a step of carrying out the master/slave selection processing by using the Bluetooth master selecting means 1102, in which any of the Bluetooth master selecting methods or any of the computer programs according to the invention is executed.

At 1203, the result of the master/slave selection processing 1202 is displayed by the master/slave display means 1103. For example, an LED is used as a display device to display the state of the device, that is, the LED is turned off when a master/slave is not determined, the LED is turned on and off when the master is selected, and the LED is turned on when the slave is selected. The display means can have various configurations in which a plurality of LEDs is arranged and distinguished from each other depending on lighting positions, an LED capable of carrying out plural coloring operations is used or a part of the image of an LCD or a CRT is displayed, for example.

According to the Bluetooth apparatus in accordance with the embodiment, thus, it is possible to start the processing of automatically selecting an optimum master in a Bluetooth network by the Bluetooth master selecting method or the computer program according to the invention and to display a result thereof.

According to the Bluetooth master selecting method and the Bluetooth master selecting program in accordance with the invention, it is possible to decide whether a self-device or another device is suitable for a master by acquiring necessary evaluation information from other Bluetooth devices to which respective Bluetooth devices capable of being the masters can be connected, carrying out an evaluation by a predetermined method and comparing them with each other. Consequently, it is possible to produce such an advantage that the Bluetooth apparatus having an optimum evaluation can automatically be selected as the master without a manual operation, and the invention is useful for the Bluetooth network technology.

What is claimed is:

1. A Bluetooth master selecting method for selecting a master and a slave from a plurality of Bluetooth apparatuses to build a Bluetooth network, comprising the steps of:
   broadcasting an inquiry, by the respective Bluetooth apparatuses capable of being the masters or the slaves, to the other Bluetooth apparatuses, for confirming a potentiality to connect the respective Bluetooth apparatuses to the other Bluetooth apparatuses;
   acquiring a Bluetooth device address of a connectable Bluetooth apparatus in response to the inquiry by respective Bluetooth apparatuses capable of being the masters or the slaves;
   acquiring necessary evaluation information from the respective Bluetooth apparatuses having the acquired Bluetooth device addresses by the respective Bluetooth apparatuses capable of being the masters or the slaves; and
   determining the Bluetooth apparatus to be the master or the slave based on a predetermined evaluating method for the evaluation information.

2. The Bluetooth master selecting method according to claim 1,
   wherein the step of determining the Bluetooth apparatus to be the master determines the Bluetooth apparatus to be the master based on a predetermined evaluating method for a plurality of evaluation information in preset order.

3. The Bluetooth master selecting method according to claim 1,
   wherein the predetermined evaluating method for the evaluation information determines, as the master, a Bluetooth apparatus having the largest number of Bluetooth device address discoveries in the connectable Bluetooth apparatus which are acquired by the respective Bluetooth apparatuses capable of being the masters.

4. The Bluetooth master selecting method according to claim 1,
   wherein the predetermined evaluating method for the evaluation information determines, as the master, a Bluetooth apparatus having the greatest predetermined evaluation value of received signal power from the Bluetooth apparatuses to which the respective Bluetooth apparatuses capable of being the masters can be connected.

5. The Bluetooth master selecting method according to claim 1,
   wherein the predetermined evaluating method for the evaluation information determines, as the master, a Bluetooth apparatus having the best predetermined evaluation value of sensitivity performance (bit error rate) from the Bluetooth apparatuses to which the respective Bluetooth apparatuses capable of being the masters can be connected.

6. The Bluetooth master selecting method according to claim 1,
   wherein the predetermined evaluating method for the evaluation information determines, as the master, a Bluetooth apparatus having the greatest evaluation value of CPU allowances in the respective Bluetooth apparatuses capable of being the masters.

7. The Bluetooth master selecting method according to claim 1,
   wherein the predetermined evaluating method for the evaluation information determines, as the master, a Bluetooth apparatus having the greatest evaluation value of power allowances in the respective Bluetooth apparatuses capable of being the masters.

8. The Bluetooth master selecting method according to claim 1,
   wherein the predetermined evaluating method for the evaluation information determines, as the master, a Bluetooth apparatus in which a specific value given uniquely and capable of being compared mutually is a maximum or minimum in a Bluetooth network for the respective Bluetooth apparatuses capable of being the masters.

9. The Bluetooth master selecting method according to any of claim 1, further comprising a step of:
   restricting the Bluetooth apparatus capable of being the master to satisfy a predetermined condition and acquiring a Bluetooth device address of a connectable Bluetooth master apparatus in response to the inquiry request.

10. The Bluetooth master selecting method according to claim 1,
    wherein the Bluetooth device capable of being the master is determined to be a slave device if a number of Bluetooth device address discoveries in a connectable Bluetooth apparatus which are acquired by the respective Bluetooth apparatuses capable of being the masters is smaller than a predetermined threshold as a result of the inquiry carried out once or plural times, and the number of Bluetooth device address discoveries in the connectable Bluetooth apparatus is compared with that in the other Bluetooth apparatus capable of being the master and any of the Bluetooth apparatuses which has the largest number of Bluetooth device address discoveries is determined as the master if the number of Bluetooth device address discoveries in the connectable Bluetooth apparatuses is equal to or larger than the predetermined threshold.

11. The Bluetooth master selecting method according to claim 1,
    wherein the predetermined evaluating method for the evaluation information determines, as the master, a Bluetooth apparatus having the largest total number of Bluetooth device address discoveries in the connectable Bluetooth apparatuses which are acquired by the respective Bluetooth apparatuses capable of being the masters as a result of the inquiry carried out at the plural time.

12. A Bluetooth master selecting program for selecting a master and a slave from a plurality of Bluetooth apparatuses to build a Bluetooth network, causing a computer to execute the steps of:
    broadcasting an inquiry, by the respective Bluetooth apparatuses capable of being the masters or slaves, to the other Bluetooth apparatuses, for confirming a potentiality to connect the respective Bluetooth apparatuses to the other Bluetooth apparatuses;
    acquiring a Bluetooth device address of a connectable Bluetooth apparatus in response to the inquiry by the respective Bluetooth apparatuses capable of being the masters or the slaves;
    acquiring necessary evaluation information from the respective Bluetooth apparatuses having the acquired Bluetooth device addresses by the respective Bluetooth apparatuses capable of being the masters or the slaves; and
    determining the Bluetooth apparatus to be a master or a slave based on a predetermined evaluating method for the evaluation information.

13. The Bluetooth master selecting program according to claim 12,
wherein the predetermined evaluating method for the evaluation information is at least one selected from the followings:
an evaluating method of determining, as the master, a Bluetooth apparatus having the largest number of Bluetooth device address discoveries of connectable Bluetooth apparatuses which are acquired by the respective Bluetooth apparatuses capable of being the masters;
an evaluating method of determining, as the master, a Bluetooth apparatus having the greatest predetermined evaluation value of received signal power from the Bluetooth apparatuses to which the respective Bluetooth apparatuses capable of being the masters can be connected;
an evaluating method of determining, as the master, a Bluetooth apparatus having the best predetermined evaluation value of bit error rate in signals received by the Bluetooth apparatuses to which the respective Bluetooth apparatuses capable of being the masters can be connected;
an evaluating method of determining, as the master, a Bluetooth apparatus having the greatest evaluation value of CPU allowances in the respective Bluetooth apparatuses capable of being the masters;
an evaluating method of determining, as the master, a Bluetooth apparatus having the greatest evaluation value of power allowances in the respective Bluetooth apparatuses capable of being the masters; and
an evaluating method of determining, as the master, a Bluetooth apparatus in which a specific value given uniquely and capable of being compared mutually is a maximum or minimum in a Bluetooth network for the respective Bluetooth apparatuses capable of being the masters.

14. A Bluetooth apparatus for functioning as a master or a slave to build a Bluetooth network, comprising:
switch means for operating to start an execution of the program according to claim 12.

15. The Bluetooth apparatus according to claim 14, further comprising:
means for displaying a self-state determined by an execution of the program according to claim 12 or 13.

* * * * *